(No Model.)  J. DAWSON.  4 Sheets—Sheet 1.
WATER HEATER.

No. 488,709. Patented Dec. 27, 1892.

WITNESSES:

INVENTOR:
John Dawson.
by Herbert W. T. Jenner.
Attorney.

(No Model.) 4 Sheets—Sheet 2.

J. DAWSON.
WATER HEATER.

No. 488,709. Patented Dec. 27, 1892.

(No Model.) 4 Sheets—Sheet 3.
J. DAWSON.
WATER HEATER.
No. 488,709. Patented Dec. 27, 1892.
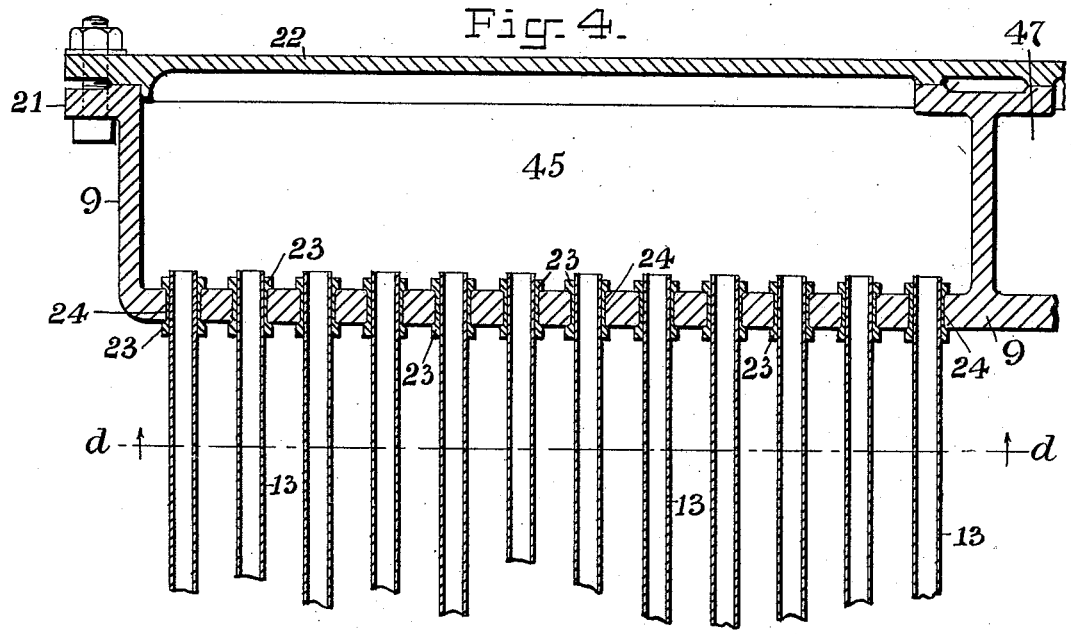
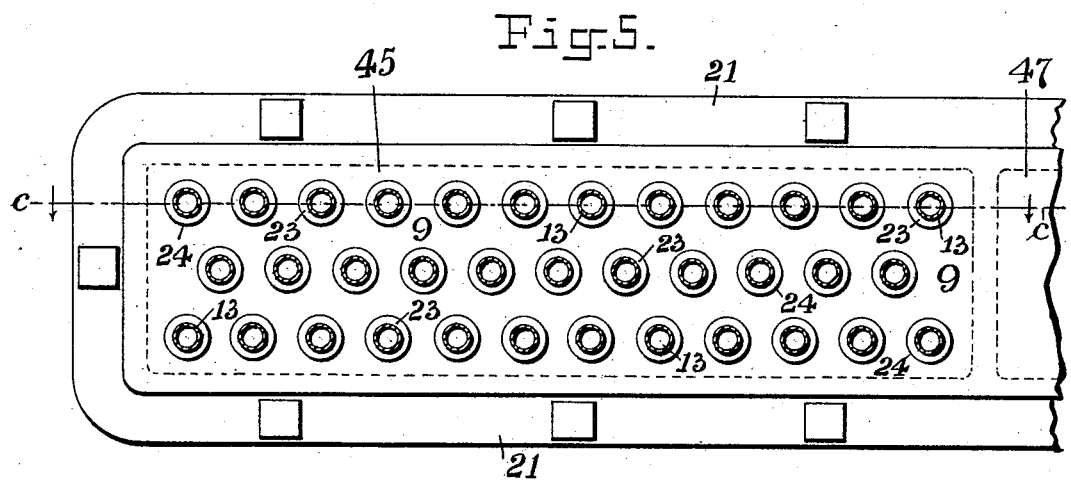
WITNESSES:
INVENTOR:
John Dawson
by Herbert W. T. Jenner.
Attorney.

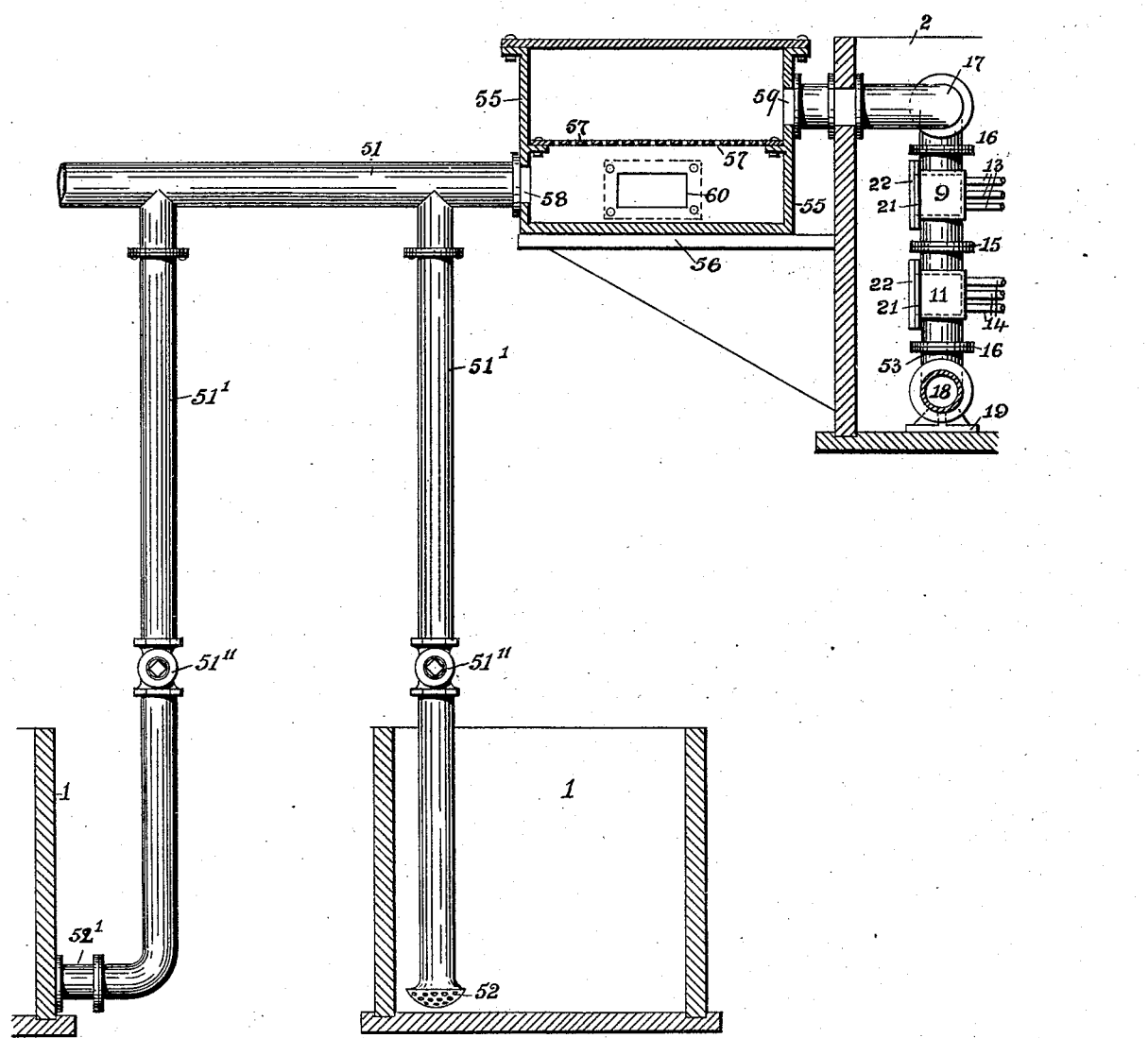

UNITED STATES PATENT OFFICE.

JOHN DAWSON, OF HUDDERSFIELD, ENGLAND.

WATER-HEATER.

SPECIFICATION forming part of Letters Patent No. 488,709, dated December 27, 1892.

Application filed August 8, 1892. Serial No. 442,435. (No model.)

*To all whom it may concern:*

Be it known that I, JOHN DAWSON, a subject of the Queen of Great Britain, residing at Huddersfield, in the county of York, England, have invented certain new and useful Improvements in Water-Heaters; and I do hereby declare the following to be a full, clear, and exact description of the invention, such as will enable others skilled in the art to which it appertains to make and use the same.

The objects of my invention are to utilize the heat of spent or waste liquids for heating fresh water to be used in various manufacturing processes in factories workshops and other places where quantities of liquids at high temperature are being constantly used up and run off into the river, and fresh water substituted therefor, as, for example, in dye-houses where the water has to be raised to the boil in preparing the bath for dyeing, and whereas, instead of supplying the vessel with cold water and heating it with steam, such vessel, according to my invention, is supplied with water which has been raised to within a few degrees of the heat of the boiling liquids discharged from the dye vessel by absorbing such heat before the spent liquids are sent into the river or conduit, whereby but little steam is necessary to boil the water and great economy and saving in fuel is effected.

To the aforesaid purpose my invention consists in the novel and peculiar construction and arrangement of tube boxes and tubes in tiers or stacks within a large water tank into and through which tubes and tube boxes the spent liquid is drawn or forced by pump injector or other like means and the heat thereof conducted by the tubes to the water surrounding them which thus becomes heated and can be supplied to various vessels where hot water is required in manufacturing or trade processes.

Figure 1:
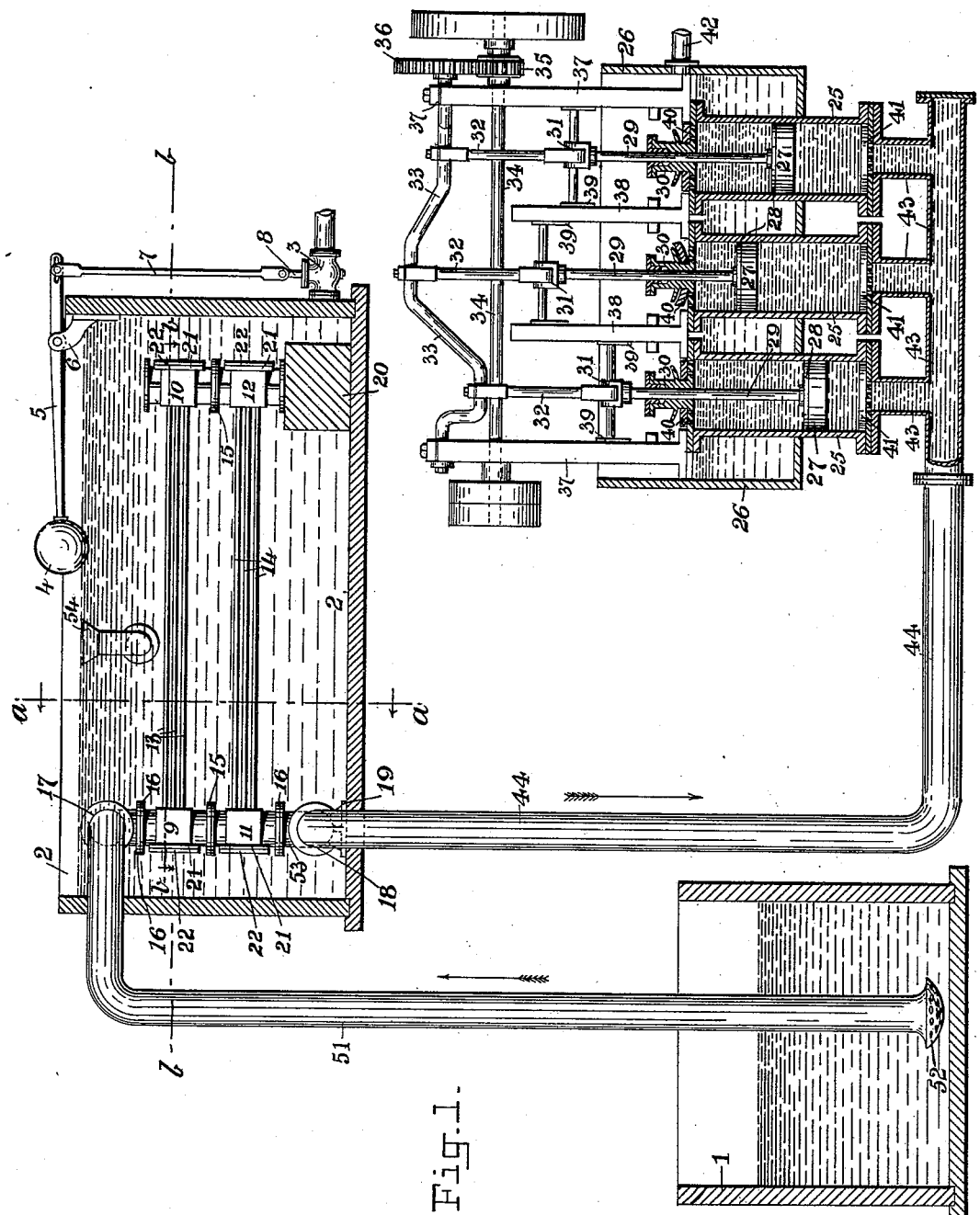
Figure 2:
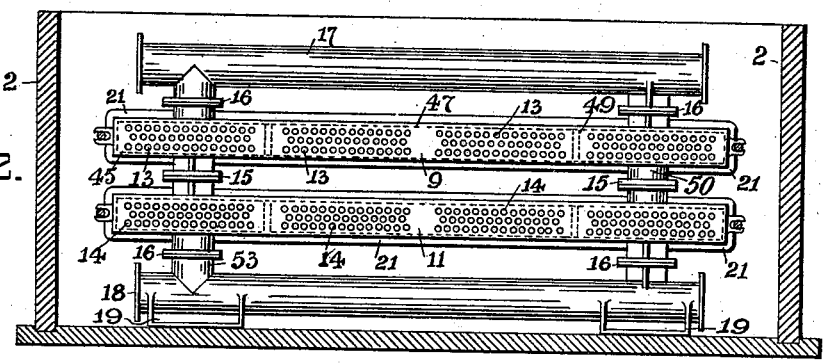
Figure 3:
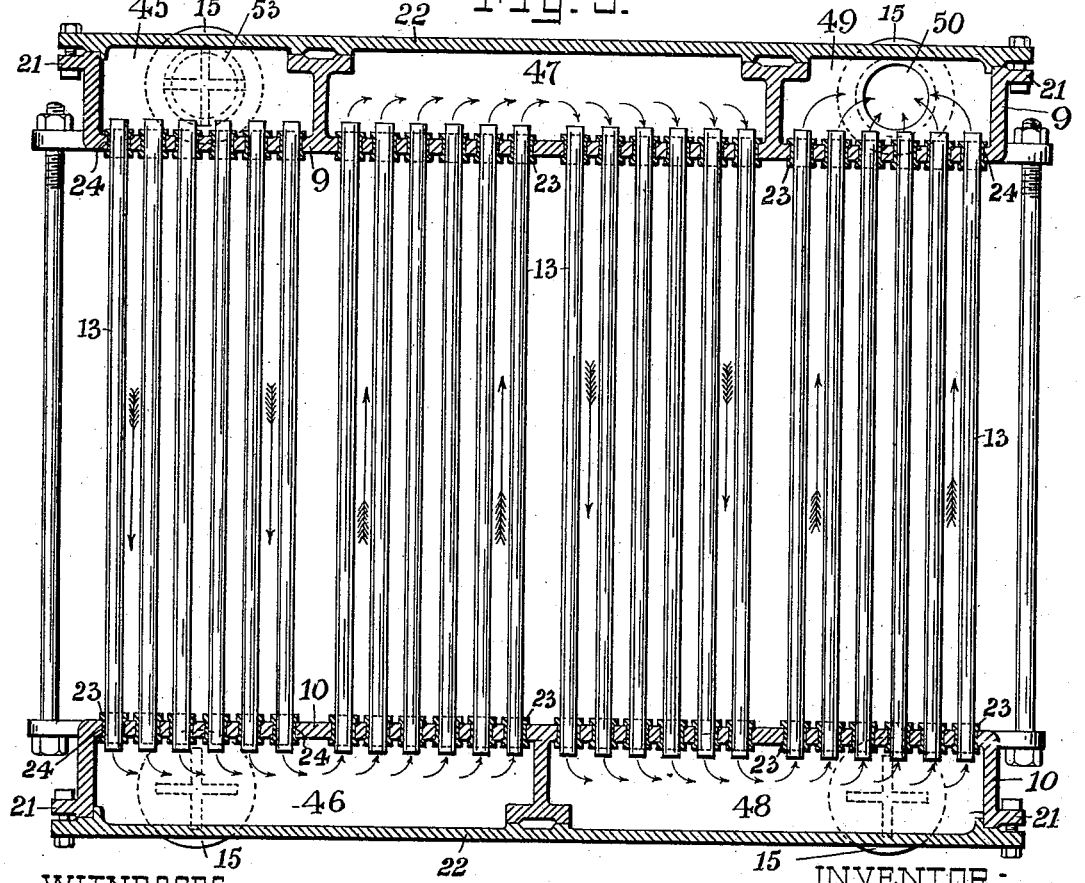

Referring to the drawings which form a part of this specification, Figure 1 is an elevation in section of a vessel in which hot or boiling water is used in carrying on some process of manufacture, a water tank having the tube stacks therein, and a triple acting vacuum pump for drawing the spent liquid from its containing vessel into and through the tube stacks and finally discharging it into the river or conduit, the said parts forming a combined whole for effecting the purposes of my invention of which the feed water tank and tube stacks comprise the most essential parts, the pump being of the construction shown, or an ordinary pump or injector which is on the premises and can be adapted to draw or force spent liquids through the tube stacks, may be employed. Fig. 2 is a cross section of the feed water tank and tube stacks taken on line $a\,a$ of Fig. 1. Fig. 3 is a sectional plan or top view, slightly enlarged, of the upper tube boxes and tubes taken on line $b\,b$ of Fig. 1. Fig. 4 is an enlarged sectional plan of one of the tube boxes and tubes taken on line $c\,c$ of Fig. 5 showing the method of connecting the tubes to the tube boxes and making the joints watertight. Fig. 5 is an elevation of tube box taken on line $d\,d$ of Fig. 4 showing the tubes in cross section. Fig. 6 is a sectional detail showing a filter placed intermediate of the waste or spent liquid supply pipe and the tube stacks for preventing the passage of bits of wood, fiber or other foreign matter into the tubes.

The numerals used in referring to the several parts indicate corresponding parts throughout.

1 indicates a vessel in which liquid at a high temperature is used in some process of manufacture, said liquid after being exhausted or rendered of no further use, being discharged from the vessel and fresh water supplied thereto for the next process which fresh water it is my intention first to heat by absorption of the heat contained in the spent liquid.

2 indicates the fresh water tank supported in the usual manner above the floor level and near the top of the room or building. Cold water is supplied to the tank through valve 3 which is opened and closed by a float 4 carried by lever 5 pivoted to bracket 6 bolted to the side of the tank, and connected by rod 7 to the valve spindle 8. As the water in the tank falls below or rises to a fixed level, it causes the float 4 to descend or rise and oscillate the lever 5 which raises or lowers the valve spindle and so admits or shuts off the water.

Within the feed water tank 2 are the tube stacks arranged in tiers one above the other and consisting of upper tube boxes 9, 10 and lower tube boxes 11. 12 and the two series of tubes 13 and 14 forming water passages communicating with the boxes 9. 10 and 11. 12 respectively.

The tube boxes 9 and 11 are divided into three or more separate chambers or compartments and the boxes 10 and 12 into two or more chambers or compartments while the tubes are arranged in sections each connected with separate chambers in the boxes so that the liquid shall be caused to flow from one compartment in the boxes at one side to a compartment in the opposite boxes and from thence back again to a second compartment in the opposite boxes, or backward and forward between the boxes. The tube boxes are cast with flanges 15 by which the upper and lower boxes are coupled together and secured by bolts, and with other flanges 16 to which are coupled the inlet pipe 17 and outlet pipe 18, the latter having feet 19 by which one side of the water heater is supported, the opposite side resting upon a beam 20 at the bottom of the water tank. A flange 21 projects all around the tube boxes to which lids or covers 22 are bolted to seal the boxes. The open ends of the tubes extend through the walls or shells of the tube boxes as shown in Figs. 3 and 4 and are inserted into short wood bushes or collars 23 driven tightly into openings 24 in the walls of the tube boxes. The wood bushes or collars are moistened so that on the wood expanding the inner walls of the bushes bind tightly against the tubes 13 and 14 while the outer surfaces of the tubes also bind more tightly against the sides of the openings 24 and expand at the extremities as shown plainly in Fig. 4 thereby engaging with the inner and outer faces of the walls of the boxes and making a secure and tight joint.

The pump for drawing spent liquids from their containing vessels into and through the tube stacks is a triple acting pump having three cylinders 25 fixed within a cistern 26. Working within the cylinders are three buckets or pistons 27 which are perforated and covered with india rubber or leather washers or diaphragms 28. The piston rods 29 pass through glands or stuffing boxes 30 at the top of the cylinders and are hinged or pivoted at 31 to connecting rods 32 secured to the triple crank 33 which receives motion from the main driving shaft 34 through pinion 35 and spur wheel 36. The crank and shafting are supported in pedestals 37 and the pistons are guided vertically by slides 39 adapted to slide vertically in ways in the pedestals 37 and 38. The top and bottom of the cylinders are perforated and covered with india rubber diaphragms 40 and 41 which said diaphragms are caused to rise by the up stroke of the pistons and admit water to and allow of the exit of water from the cylinders, the diaphragms 28 being also raised clear of the faces of the pistons by the resistance of water to their descent and permitting water to pass from the bottom to the top side of said pistons. The water discharged through the perforated tops of the cylinders passes out of the cistern 26 through pipe 42 which conducts it away to to the river or other conduit. The cylinders of the pump are coupled to the inlet pipe 43 communicating by pipe 44 with the outlet pipe 18 of the tube stacks.

To the inlet pipe 17 of the tube stacks is connected one end of a pipe 51 which terminates in a rose 52 and reaches to the bottom of the vessel 1. The water or liquid in said vessel being at boiling point or slightly lower temperature and unfit for further use is drawn up the pipe 51 by the action of the triple pump and passes through the inlet pipe 17 to the tube box 9 where it enters the chamber 45 (see Fig. 3) from whence it passes through the series of tubes in connection therewith to the chamber 46 in the opposite box 10 and from said chamber it circulates through another series of tubes into the chamber 47 then returns through a third series of pipes to the chamber 48 in box 10 and finally passes through the fourth series of tubes into the chamber 49 in box 9 as clearly indicated by the several arrows in Fig. 3. The liquid is drawn from the said chamber 49 down the pipe 50 into the lower tube box 11, where it circulates backward and forward to and from the boxes 11 and 12 in precisely the same manner as above described, but commencing from the chamber in box 11 which corresponds to the chamber 49 in box 9, and finally entering the chamber at the opposite end of box 11 and directly under the chamber 45 in box 9, from whence it passes down pipe 53 into the outlet pipe 18 and from there through pipes 44 and 43 into the pump. By circulating the spent liquid through the tube stacks in the manner herein set forth, a large heating surface is presented to the cold water in the tank 2 and the heat in the spent liquid is thereby absorbed by the water in the tank whose temperature is thus gradually raised and reaches to within a few degrees of the heat of the spent liquid before passing into the tube stacks. The tubes are preferably made of copper which is a good conductor of heat, and said tubes are of small bore so that the circulation of the spent liquid therethrough is retarded in order that sufficient time may thus be given to absorb the whole of the heat in said liquid and deliver it to the outlet pipe cold.

For the purpose of preventing the passage of small pieces of dye wood, fibers or other foreign substances which may be drawn with the spent liquid through the rose 52 into the tube stacks and accumulate therein and in time choke up some of the tubes, a box or chest 55 is mounted on a platform 56, said box having a perforated tray or screen 57 supported therein between the inlet 58 and outlet 59 as shown in Fig. 6. The spent liquid enters the bottom of the box or chest through the pipe 51 and passes upward through the perforations or meshes of the tray 57 to the outlet 59 on its way to the inlet 17 of the tube stacks the said tray barring the passage of any pieces of wood, fiber or other matters therethrough to the outlet 59, which therefore fall into the bottom of the box. The box is from time to time cleaned out, access being had thereto by means of a door 60.

Although there are only two series of tube boxes with their communicating tubes shown in the drawings it will be evident that for heating much larger quantities of water, there may be added thereto other tube boxes with the same or a larger or smaller number of chambers or compartments and tubes which would be constructed and built up on the top of those shown, in the manner described with reference to the several figures, and it will be further obvious that instead of the pump described herein, ordinary vacuum or force pumps or an injector which may be already on the premises may be used for drawing or forcing the liquid through the tube stacks.

The hot water obtained by utilizing the heat of spent liquids is drawn or flows from the top of the tank down a funnel mouthed pipe 54 from which the vessel 1 or other vessels may be supplied, and very little steam will be necessary to boil the water.

By utilizing the heat of waste or spent liquids for heating feed water the steam which has hitherto had to be used for this purpose is not now required and, therefore, a great saving in fuel is obtained wherever quantities of hot water or liquids are frequently used during the day and have from time to time to be discharged and replaced with fresh water.

In Fig. 1 the pipe 44 is shown in conjunction with a single vessel, but where there are a number of vessels in use, as in a dyehouse, such said pipe may form a main pipe as shown in Fig. 6 and branch pipes 51' to be taken therefrom to the several vessels. The branch pipes are provided with roses 52 at their ends or are coupled to the ordinary outlet pipe 52' of said vessels, both methods being shown in Fig. 6, the number and position of the pipes and their connection with the vessels being a matter of arrangement depending upon surroundings and the number and position of vessels in use. The branch pipes are also provided with valves 51'' so that any vessel or vessels may be emptied independently of the others.

I claim as my invention:—

1. The apparatus for utilizing the heat of waste or spent liquids, for heating fresh water comprising a tank adapted to hold a quantity of fresh water, an inlet pipe to said tank provided with a valve which is opened and closed by vertical rod connected to one end of a pivoted lever carrying a float as the water in said tank falls below or attains to a fixed level, tube stacks consisting of boxes arranged a distance apart in said tank and in couples one above the other, those on one side each being divided by partitions into three or more separate chambers or compartments and those on the opposite side being each divided into two or more compartments, the boxes in the same plane being connected together by tubes of small bore and forming water passages between each box, and communicating with the several compartments so as to circulate the liquid drawn or forced therethrough, backward and forward from a compartment in one box to a compartment in the opposite box, two compartments in the boxes 9 and 11 being in communication with each other by a pipe placed intermediate of said boxes and conveying the liquid from the upper to the lower series of tubes and boxes, said tube stacks having an inlet pipe for admitting hot waste liquids thereto and an outlet pipe by which the liquid, after passing through the tubes and boxes and parting with its heat to the fresh water, is discharged into the river all substantially as described and for purposes set forth.

2. In apparatus for utilizing the heat of waste or spent liquids, for heating fresh water, the combination, with tube stacks, consisting of boxes 9 10 and 11 12 sealed up by lids bolted to projecting flanges on said boxes and divided by partitions to form separate chambers, small bore tubes arranged in series one above the other and having their ends projecting through the opposing walls of the tube boxes and forming water passages communicating with the several chambers in said boxes, said tubes being secured in openings in the walls of the boxes by wood bosses or collars which are caused to expand by moisture and make a tight joint between the tube and its corresponding opening in the boxes, an intermediate pipe 50 forming a communication between the boxes 9 and 11, inlet and outlet pipes 17 and 18, and a fresh water tank 2 in which the tube stacks are placed, of a pump comprising three cylinders and pistons working therein which draw the spent liquid from its containing vessel into and through the tubes and boxes and finally discharges it into the cistern 26, from whence it runs out through pipe 42 into the river all substantially as described and for purposes set forth.

In testimony whereof I affix my signature in presence of two witnesses.

JOHN DAWSON.

Witnesses:
 ARTHUR B. CROSSLEY,
  *Market Place, Huddersfield.*
 THOMAS A. BARRON,
  *Huddersfield.*